United States Patent [19]

Moreau

[11] Patent Number: 5,766,296
[45] Date of Patent: Jun. 16, 1998

[54] FURNACE FOR MELTING GLASS AND METHOD FOR USING GLASS PRODUCED THEREIN

[75] Inventor: Raymond Moreau, Croissy Sur Seine, France

[73] Assignee: Saint-Gobain Vitrage, Courbevoie, France

[21] Appl. No.: 688,930

[22] Filed: Jul. 31, 1996

[30] Foreign Application Priority Data

Aug. 3, 1995 [FR] France .................... 95 09484

[51] Int. Cl.⁶ .................................................. C03B 5/193
[52] U.S. Cl. .......................... 65/34.5; 65/178; 65/335; 65/346
[58] Field of Search ........................ 65/134.5, 135.1, 65/135.7, 135.8, 178, 335, 346

[56] References Cited

U.S. PATENT DOCUMENTS

| | | | |
|---|---|---|---|
| 3,536,470 | 10/1970 | Brichard et al. | 65/337 |
| 3,888,650 | 6/1975 | Gell et al. | 65/125 |
| 4,599,100 | 7/1986 | Demarest, Jr. | 65/134.4 |
| 4,892,573 | 1/1990 | Delage et al. | 65/179 |
| 4,929,266 | 5/1990 | Cozac et al. | 65/134.5 |
| 4,981,504 | 1/1991 | Delage et al. | 65/135.3 |

FOREIGN PATENT DOCUMENTS

| | | |
|---|---|---|
| 0 650 934 | 5/1995 | European Pat. Off. |
| 77649 | 6/1977 | Luxembourg . |
| 514775 | 5/1976 | U.S.S.R. |
| 874673 | 10/1981 | U.S.S.R. |
| 1043477 | 9/1966 | United Kingdom . |
| 2169891 | 7/1986 | United Kingdom . |

OTHER PUBLICATIONS

Database WPIDS, week 9522, Derwent Information Ltd., AN-95-163358, Class L01, EP 650934 A1, (Gobert et al), abstract, May 1995.

Lebedeva, et al., "Features of Molten Glass Motion in Melting Tanks of Furnaces with Different Configuration of the Bottom Between the Bubbling Zones", Steklo i Keramika, No.5, pp. 14–15 (Trans.), Gusev Branch of the State Scientific–Research Inst. of Glass, May 1978.

*Primary Examiner*—Stanley S. Silverman
*Assistant Examiner*—Sean Vincent
*Attorney, Agent, or Firm*—Pennie & Edmonds LLP

[57] ABSTRACT

A furnace (1) for melting vitrifiable materials, including a compartment (2) for melting and refining the glass equipped, upstream, with at least one means (4) for charging vitrifiable-materials and leading, downstream, into a compartment or a series or compartments (6-7-8) intended to lead the molten glass as far as the forming zone. It is equipped with a first means for controlling the convective flows of the mass of molten glass in the form of a transverse sill (14) delimiting an "upstream" zone (3) and a "downstream" zone (5). Associated with this sill are complementary means for controlling the convective flows in the "upstream" zone including, as a minimum, submerged "upstream" heating means (15) located close to and upstream of the sill, in order to prevent molten glass that has reached said the "downstream" zone from returning into the said "upstream" zone.

Another subject of the invention is the application of such a furnace and the method of operating it.

21 Claims, 1 Drawing Sheet

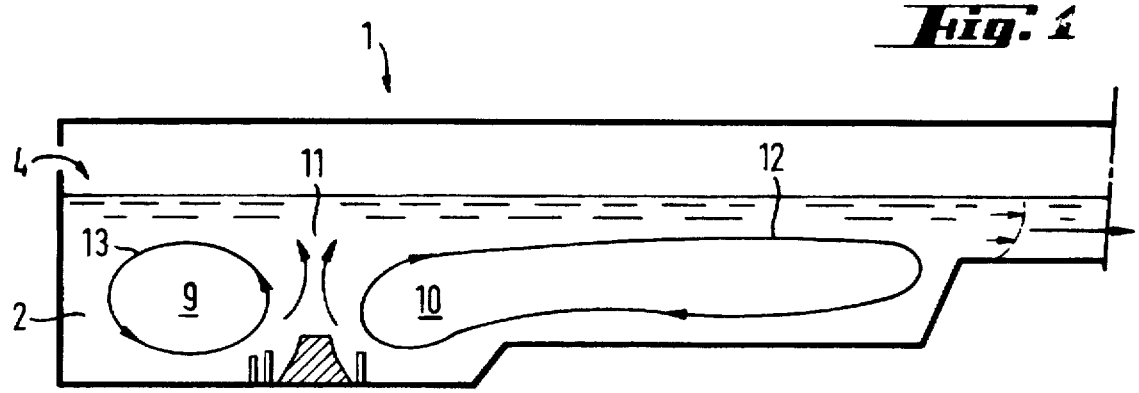
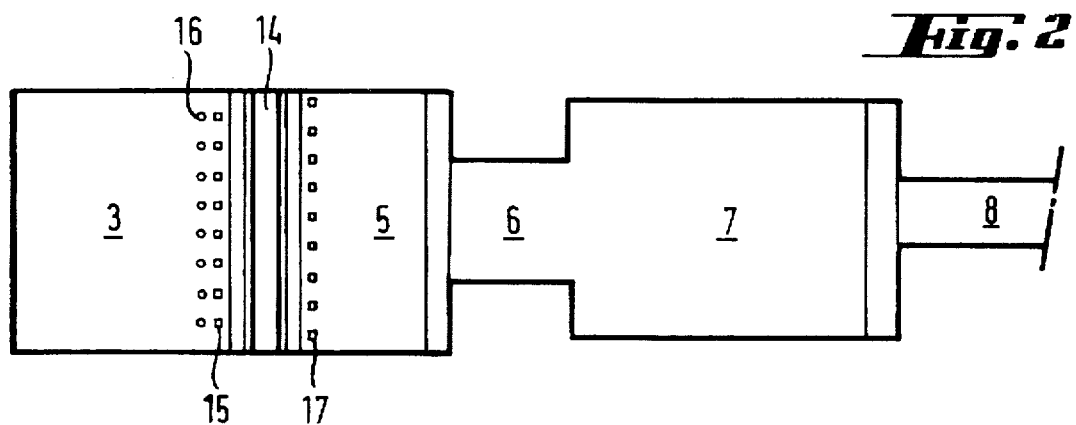
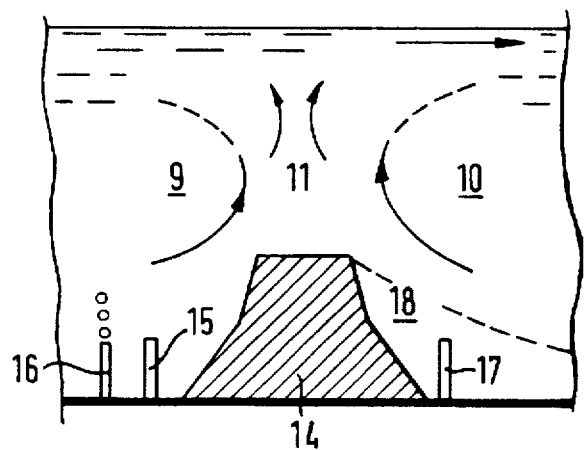

FURNACE FOR MELTING GLASS AND METHOD FOR USING GLASS PRODUCED THEREIN

BACKGROUND OF THE INVENTION

The invention relates to a device for melting and refining glass from vitrifiable materials, the device more commonly being known as a melting furnace, with a view to the continuous supplying of molten glass to plant for forming flat glass such as float - glass or glass - rolling plant.

The invention deals more specifically with melting furnaces for flat glass involving high production capabilities, a capability which may, for example, be quantified as runs of at least 100 tonnes/day and which may reach as much as 1000 tonnes/day and more. However, it is also advantageously applicable to furnaces of a smaller size.

It is more concerted with so-called "flame heated furnaces" that is to say ones in which the heating power is provided by burners, as described in Patents U.S. Pat. No. 4,599,100 or EP-0-650,934, than with so-called "cold crown furnaces" where the heating power is supplied by electrodes immersed in tho bath of molten glass.

A common structure for such flame-heated furnaces includes, in the known manner, a series of compartments leading into each other and each having specific functions and dimensions in order to guarantee the melting of the vitrifiable materials and the thermal and chemical homogeneity of the glass once melted.

Thus, patent EP-B-0,264,327 makes known a melting furnace structure comprising a first compartment in which the melting and refining of the glass-making composition take place, followed by a restricting compartment called the neck.

This neck leads into a second compartment where the homogenization, especially the thermal homogenization, of the molten glass takes place, this compartment being known by the name of conditioning zone and leading into a run-off channel ot much smaller cross-section which pours the molten glass towards the appropriate forming plant.

A constant concern in the design and operation of melting furnaces is to understand and master the convective flows in the mass of molten glass, especially in the compartments where melting and refining take place.

This is because numerous parameters, such as the geometry of the furnace and the method of heating, determine how belts of convective recirculation are set up in the molten glass as a result of modifications in the density of the glass depending on the degree to which it is heated. The characteristics of these recirculation belts, especially their size, their location, their kinetics or their stability, have a direct influence on the performance of the furnace, for example on its energy consumption, its output or the quality of glass produced.

Thus, in a flame-heated furnace there are generally two main belts present one after the other in the melting and refining compartment, one situated in a upstream zone, where the progressive melting of the supernatant vitrifiable materials takes place, and the other situated in a downstream zone where most of the refining of the glass takes place. The common zone separating them, where the glass of both belts "rises" is known by various terms such as the resurgence zone, thermal spring zone, or "hot spot", by contrast with the opposite ends of the two belts which are called "cold spots".

Various studies have already been conducted into controlling these convective flows. Thus, with a view to reducing the energy Consumption of a flame-heated furnace, U.S. Pat. No. 3,536,470 proposed the installation in the melting/refining compartment of a transverse sill, that is to say a low, internally cooled wall arranged on the bottom across the length of the compartment. This wall was to make it possible to reduce the amount of glass in the recirculation belts which moves back up towards the hot spot and which therefore belongs to what are known as the "back currents" it would thus reduce the amount of calorific power spent on heating this "colder" glass again by a corresponding amount.

However, although this wall can have an effect on the flow rate of these back currents by acting as a brake, it cannot, by itself, give control over the convective flows, especially over the location of the hot spot.

SUMMARY OF THE INVENTION

The object of the invention is therefore to mitigate this inadequacy by proposing a new type of furnace which allows better control of the convective flows in the melting and refining compartment.

The subject of the invention is a furnace for melting vitrifiable materials, including a compartment for melting and refining the glass equipped, upstream, with at least one means for charging vitrifiable materials and leading, downstream, into a compartment or a series of compartments intended to lead the molten glass as far as the forming zone.

This melting and refining compartment is equipped with a first means for controlling the convective flows of the mass of molten glass in the form of a transverse sill delimiting an "upstream" zone and a downstream zone in the compartment, the "upstream" zone therefore being the zone stretching from the zone where the vitrifiable materials are charged as far as the sill, and the "downstream" zone extending from the sill as far as the compartment(s) continuing the melting and refining compartment as far as the forming plant. In the sense of the invention, "transverse sill" is understood to be a submerged wall placed on the tank bottom across the width of the compartment and arranged approximately transversely to its length, that is to say in fact approximately perpendicular to the direction of the molten glass output current.

According to the invention, associated with this first means are complementary means for controlling the convective flows in the "upstream" zone including, as a minimum, submerged "upstream" heating means located close to and upstream of the sill, the combination of these means preventing molten glass that has reached the "downstream" zone from returning into the "upstream" zone.

Thus, by virtue of these complementary means, the wall no longer acts simply like a brake as in the teaching of the aforementioned American Patent U.S. Pat. No. 3,536,470, but acts as an almost insurmountable obstacle to the molten glass once the latter has passed into the "downstream" zone. This is extremely advantageous from the point of view of energy consumption and of quality of the glass: there is no longer any need, in the upstream zone, to reheat a certain mass of molten glass coming from the "downstream" zone. What is more, the glass which has reached the "downstream" zone can be refined there, before being removed to the next compartment, in an optimum manner, without the possibility of it being entrained back to the upstream part and thus brought into contact with the glass which is not yet refined.

In practice, in the case of a melting and refining compartment of a flame-heated furnace, most of the heating power is provided by burners, and the transverse sill according to the invention is preferably arranged approximately in the zone of the compartment where the "hot spot" separating the two convective recirculation belts naturally occurs.

In this way, the combination of the sill and of the complementary means according to the invention gives fine control over the convective flows, notably in two ways: it allows strict separation of the two belts on each side of the transverse sill, as already seen preventing this second belt, that is to say the one set up in the zone "downstream" of the sill, from surmounting this sill thus letting molten glass which has already been completely or partially refined back into the "upstream" zone. In order to achieve this, it fixes and stabilizes the resurgence zone known as the "hot spot" between the two belts, especially vertically in line with or close to this sill. The invention therefore has a highly advantageous effect of stabilizing and of controlling the convective recirculation belts which occur in the compartment, something that the presence of a transverse sill alone cannot achieve.

The location and geometry of the transverse sill are important. This is why it is preferred to arrange the transverse sill approximately ⅓ to ⅔ of the way along the length of the melting and refining compartment. This in fact amounts to arranging the sill, as previously mentioned, close to the zone where the resurgence zone would, in a more or less stable manner, occur in the absence of a sill. Upstream there is thus a zone given over predominantly to the melting of the vitrifiable materials and, downstream of this sill, there is a zone given over predominantly to the refining of the glass once molten.

Advantageously, a sill configuration is chosen such that its height is at most equal to half of the depth of the molten glass in the compartment and, in particular, of a height equal to approximately one quarter or one third of this height of glass, because the sill does not have to be very tall to be effective, this being all the more true since it has to be taken into account that if it were very tall it would tend to corrode more quickly.

Various geometries may be adopted for this sill, the simplest consists in choosing a parallelepipedal section, effectively giving it the shape of a wall. However, it is preferable to give the section a profile with cut-off or rounded corners, because the latter configuration makes it possible to reduce the "shadow" effect associated with the use of a wall, that is to say the creation of zones of glass which have kinetics which are slower and temperatures which are cooler than elsewhere, close to the base of the sill. Thus it is possible to choose a sill section in which the top has a flat or rounded surface, especially a convex one, and in which the "flanks" of the said sill are inclined relative to the vertical or are rounded, with a convex or concave curvature which may vary along the height of the sill.

In the latter case, the sill may advantageously be dimensioned such that the base of the sill is greater than its height, especially twice as large.

The complementary means for controlling the convective flows associated with the transverse sill may comprise, in addition to the "upstream" heating means, submerged "upstream" bubblers close to and upstream of the transverse sill. They then contribute to refining the stabilization of the hot spot and the correct separation of the two recirculation belts on each side of the sill.

All these control means associated with the sill should be arranged very close thereto in order to have an optimum influence thereon. Thus, advantageously, they are in the "upstream" zone not more than 2000 mm, especially not more than 1500 mm away from the base of the transverse sill.

The "upstream" heating means which form part of these control means are preferably in the form of submerged electrodes, especially ones fixed to the base and with a total calorific power of not more tank bottom 1500 kW, especially a power of between 1200 and 500 kW. In material terms, one or two rows of electrodes situated parallel to the sill may suffice.

As a subsidiary point, this localized heating makes it possible to activate the convection of the first recirculation belt, the one to be found in the upstream zone. The calorific power has to be adjusted in order best to set the respective locations of the two belts and of the hot spot. It remains within low ranges, because these heating means are not intended to supplement or to replace the conventional means for eating vitrifiable materials with which the furnace is equipped, especially in the form of burners.

According to the invention, means for controlling the convective flows to be found in the "downstream" zone of the melting and refining compartment may also be associated with the transverse sill, these means comprising, as a minimum, submerged "downstream" heating means located close to and downstream of the said sill. These heating means are advantageously in the form of submerged electrodes, especially ones fixed to the base and arranged in a row or rows. In order to be fully effective they are not more than 1500 mm away from the base of the transverse sill and their maximum total calorific power is preferably not more than 100 kW, especially not more than 70 kW.

These "downstream" control means may be given various functions, these means in fact reinforcing the action of the "upstream" control means and of the transverse sill.

In the first place, they contribute to making it easier to make the separation between the convective recirculation belts of molten glass, to preventing molten glass of the belt which occurs downstream of the sill from "passing back" to the upstream zone.

Furthermore, the "downstream" heating means forming part of these control means have a highly beneficial influence on the mass of glass to be found just downstream of the sill and which is thus as it were in a "shadow" zone looking at the overall direction of flow of the molten glass in the compartment: this mass of glass, which forms part of the downstream recirculation belt of the compartment in fact tends to have a temperature which is lower and a speed which is slower than in the rest of the belt, this tendency being inherent in the use of a transverse sill which acts as an obstacle, even though it does have other advantages, as already seen.

Now, this "shadow" zone thus defined may prove to be a drawback, especially when the operating conditions of the furnace are altered, when changing from one glass composition to another, for example to switch from the production of clear glass to the production of a coloured glass. This is because during such transition periods, there is a risk of this mass of less refined "semistagnant" glass being expelled sharply from the compartment and generating defects in the molten glass produced for a not insignificant length of time. By heating this mass of glass moderately this problem can be reduced, bringing its properties (temperature, speed) closer to those of the rest of the "downstream" recirculation belt. This does not, however, involve radically altering the convective systems "downstream" of the sill, and this is why the calorific power given off is preferably not very high. It is rather an adjustment and not a true heating influencing all of the molten glass to be found downstream of the sill.

The invention is particularly well suited to furnaces designed with a melting and refining compartment leading into a series of compartments including an intermediate compartment forming a restricting compartment, then a compartment for conditioning/homogenizing the molten glass and finally a run-out channel leading the glass to the forming plant.

It relates mainly to furnaces in which burners are the prime means of melting the vitrifiable materials in the melting and refining compartment.

It applies also mainly to furnesses intended to feed glass to plant for forming flat glass of the float glass type.

Another subject of the invention is the method of operating these furnaces, which is characterized by a regulation of the operation of the complementary means for controlling the "upstream" convective flows, especially the calorific power of the heating means and/or the gas flow rate through the bubblers associated with the transverse sill, in order to fix two convective recirculation belts of molten glass on each side of this sill and fix their "thermal spring zone", especially vertically in line with or close to the said sill.

This regulation may also be effected on the means for controlling the convective flows in the "downstream" zone associated with the sill, especially to provide a controlled acceleration and/or a controlled reheating of the convective recirculation belt of molten glass in the "downstream" zone of the melting and refining compartment, in the portion located at the lower part and close to the base of the transverse sill.

BRIEF DESCRIPTION OF THE DRAWINGS

Other characteristics and advantages of the invention will appear in the detailed description of a non-limiting embodiment of the furnace, with the aid of the following figures which represent:

FIG. 1: A view in longitudinal section of the entire furnace.

FIG. 2: A plan view of the entire furnace.

FIG. 3: A view in longitudinal section of the melting and refining compartment of the furnace.

All of these figures are highly diagrammatic and, to make them easier to study, do not exactly reflect the true scale of the various elements represented.

DETAILED DESCRIPTION OF THE DRAWINGS

FIGS. 1 and 2 represent a melting furnace 1 of the "flame-heated" or alternatively "regenerative" type for supplying a float glass plant with molten glass. It is divided, as is known, into a first melting/refining tank 2 where the heating power is provided by two rows of burners (not represented) operating with a fuel/air mixture and alternately. It may be noted that the heating power could just as easily be provided by burners using oxygen as oxidizing agent and operating continuously, as described in Patent Application EP-A-0,650,934.

This tank 2 includes an "upstream" melting zone 3 where the vitrifiable materials charging port 4 is situated, and a "downstream" refining zone 5, then an intermediate compartment 6 forming a restrictive compartment known by the name of neck, then a compartment 7 for homogenizing and thermally and chemically conditioning the glass, known as a refining tank. Finally, the refining tank 7 leads into a run-out channel 8 which directly feeds the float bath, which has not been represented.

Two main glass convection belts 9, 10 naturally occur in the melting/refining compartment 2, as represented more clearly in FIG. 3, the resurgence zone 11 between the two belts corresponding to a "hot spot", whereas the opposite ends 12, 13 of the two belts correspond to "cold spots" in the mass of molten glass. "Hot" and "cold" are of course, within the context of the invention, terms which are very relative because they all relate to molten glass, but they are familiar to those skilled in the art.

It will be noted that the "downstream" belt 10 is not necessarily confined within the compartment 2. It may also pass into at least part of the next compartment. In the case represented, it does indeed stretch as far as the neck 6 and all or some of the way along the length of the refining tank 7.

The presence of a transverse sill 14 stretching across the entire width of the compartment 2 and associated, upstream, with a transverse row 15 of submerged electrodes backed by a row 16 of bubblers allows the two belts 9, 10 to be fixed and stabilized so that the resurgence zone 11 called the "hot spot" lies approximately vertically in line with the sill 14. In material terms, molten glass in the process of being refined and situated in the downstream zone 5 of the compartment 2 is thus prevented from passing back over the sill into the upstream zone 3. In this way any back current of glass from one zone to the other is eliminated or, at the very least, considerably reduced by confining the second convective belt to the downstream zone 5. This is of benefit for at least two reasons: on the one hand, it saves having to reheat glass that has already passed into the downstream zone since it now will not come back into the upstream zone, and the energy consumption of the furnace is thus reduced. On the other hand, the glass in the downstream zone is already completely or partially refined, and it is therefore not a good idea for it to mix again with glass from the upstream zone which is not yet refined.

The transverse sill 14 is arranged approximately ⅔ of the way along the length of the tank 2, and it is of a height corresponding to approximately one third of the depth of the glass. This height makes it effective enough in the light of the object of the invention and, if it were very tall, there would be the risk that this sill would wear away prematurely. The electrodes 15 are approximately 1000 mm away from its base, they may operate permanently or be activated only intermittently and they have a maximum total calorific power of approximately 1000 kW, and are regulated appropriately.

The sill 14 has a profile with cut-off corners, so that it impedes as little as possible the circulation of the molten glass in the belts in their zones close to the base of the sill, these cut-off corners having an angle of inclination relative to the vertical which reduces towards the top of the wall. The top has a surface which is horizontal in the widthways direction, the width of which corresponds to approximately one third or one quarter of the width of the base of the sill. This sill may be made as a single piece. For technical reasons here it is in fact formed of several ceramic blocks butted together.

The sill 14 is also associated with a transverse row of "downstream" electrodes 17, situated less than 800 mm away from the base of the sill. These electrodes 17 thus provide a modest additional amount of heat, but in a zone 18 of the downstream recirculation belt 10 which is relatively "sensitive", this zone 18, in the "shadow" of the sill. 14, in fact tends to have a slower speed and a temperature which is lower than in the rest of the belt, and this is not optimum for the operation of the furnace because this glass with different properties, and not very well "stirred", is likely to have defects which are found when it comes out of the furnace, especially when changing from one composition of vitrifiable materials to another. These electrodes 17 make it possible to bring the speed and temperature of this zone 18 closer to those of the rest of the belt 10 and, in fact, to eliminate any risk of defect in the glass which originated from this zone 18.

The heating power of these electrode does, however, have to be controlled precisely, because too high a calorific power could lead to localized overheating of the glass which could lead to risks of the appearance of defects, especially bubbles, in already refined glass. Like the electrodes 17, they may operate permanently, on full power or on controlled power, or alternatively intermittently as the need arises, such as when a change in running conditions of the furnace is anticipated.

It may also be noted that these downstream electrodes 17 also play a part in stabilizing and in fixing the location of the hotspot, particularly here where bubblers 16 are used upstream. They balance and alter the effect of the upstream bubblers 16 on the second belt 10 in order to contain it in the downstream zone.

The "upstream" electrodes 15 and/or the "downstream" electrodes 17 may be arranged extremely close to the base of the sill 14. In order to achieve this, use may be made of specific auxiliary ceramic blocks, not represented, equipped as appropriate and arranged immediately to each side of the base of the sill 14.

I claim:

1. A furnace for melting vitrifiable materials, comprising a melting and refining compartment having a length, said melting and refining compartment comprising:

an upstream melting zone capable of containing an upstream convective belt of glass flow;

an upstream submerged heating means positioned within the melting zone to facilitate control of said upstream convective belt of glass flow;

a plurality of submerged bubblers positioned adjacent to and upstream of said upstream submerged heating means.

a downstream refining zone capable of containing a downstream convective belt of glass flow;

a downstream submerged heating means positioned within the refining zone to facilitate control of said downstream convective belt of glass flow; and a transverse sill, positioned transversely to said length between said upstream melting zone and said downstream refining zone, having a bottom surface contacting a bottom surface of said melting and refining compartment, wherein the transverse sill has a vertical cross-section along the length of said melting and refining compartment and includes four sides including a bottom side and a top side and having upper corners which are cut-off, wherein the transverse sill inhibits upstream flow of materials from the refining zone to the melting zone; and wherein said upstream submerged heating means and said downstream submerged heating means are adjacent to said transverse sill;

means for charging said vitrifiable materials into said melting and refining compartment comprising a vitrifiable materials charging port in an upstream end wall of said melting and refining compartment; and a primary melting means for melting said vitrifiable materials in said melting and refining compartment.

2. A furnace according to claim 1 further comprising a thermal spring zone positioned between said upstream melting zone and said downstream refining zone and disposed vertically above said transverse sill.

3. A furnace according to claim 1 wherein said transverse sill is disposed within said melting and refining compartment at a distance from said upstream end wall equal to from one-third to two-thirds of the length of said melting and refining compartment.

4. A furnace according to claim 1 wherein said transverse sill has a height of not more than one-half of a mean depth of a volume of vitrifiable material disposed within said melting and refining compartment.

5. A furnace according to claim 4 wherein said transverse sill has a height of from about one-fourth to about one-third of a mean depth of a volume of vitrifiable material disposed within said melting and refining compartment.

6. A furnace according to claim 1 wherein said cross-section has a greater width than height between said top side and said bottom side.

7. A furnace according to claim 6 wherein said width is about twice said height.

8. A furnace according to claim 1 wherein said upstream submerged heating means is positioned not more than 2000 mm from an upstream edge of said bottom surface of said transverse sill.

9. A furnace according to claim 8 wherein said upstream submerged heating means is positioned not more than 1500 mm from the upstream edge.

10. A furnace according to claim 1 wherein said upstream submerged heating means comprises a plurality of submerged electrodes affixed to said bottom surface of said melting and refining compartment and supplied with a power of not more than 1500 kW.

11. A furnace according to claim 10 wherein said power is between 500 kW and 1200 kW.

12. A furnace according to claim 1 wherein said downstream submerged heating means is positioned not more than 1500 mm from a downstream edge of said bottom surface of said transverse sill.

13. A furnace according to claim 1 wherein said downstream submerged heating means comprises a plurality of submerged electrodes affixed to said bottom surface of said melting and refining compartment and supplied with a power of not more than 100 kW.

14. A furnace according to claim 13 wherein said power is not more than 70 kW.

15. The furnace according to claim 1, wherein the vertical cross-section of the transverse sill further comprises a curved upstream side and a curved downstream side.

16. The furnace according to claim 6, wherein the vertical cross-section of the transverse sill further comprises a plurality of upstream sides and a plurality of downstream sides.

17. The furnace according to claim 1, wherein the upper corners of the vertical cross-section of the transverse sill are rounded.

18. A furnace according to claim 1 further comprising an intermediate restrictive compartment positioned downstream from and adjacent to said melting and refining zone, a conditioning and homogenizing compartment positioned downstream from and adjacent to said intermediate restrictive compartment, and a run-out channel positioned downstream from and adjacent to said conditioning and homogenizing compartment, wherein said melting and refining compartment, said intermediate restrictive compartment, said conditioning and homogenizing compartment, and said run-out channel are interconnected to facilitate a continuous flow of a volume of molten glass therebetween from the upstream end wall in a downstream direction.

19. A furnace according to claim 1 wherein said primary melting means comprises a plurality of burners.

20. A method of melting and refining vitrifiable materials which comprises:

constructing a furnace comprising a melting and refining compartment having a length, said melting and refining compartment comprising:

an upstream melting zone capable of containing an upstream convective belt of glass flow;

an upstream submerged heating means positioned within the melting zone to facilitate control of said upstream convective belt of glass flow;

a plurality of submerge bubblers positioned adjacent to and upstream of said upstream submerged heating means;

a downstream refining zone capable of containing a downstream convective belt of glass flow;

a downstream submerged heating means positioned within the refining zone to facilitate control of said downstream convective belt of glass flow; and a transverse sill, positioned transversely to said length between said upstream melting zone and said downstream refining zone, having a bottom surface contacting a bottom surface of said melting and refining compartment, wherein the transverse sill has a vertical cross-section along the length of said melting and refining compartment and includes four sides including a bottom side and a top side and having upper corners which are cut-off, wherein the transverse sill inhibits upstream flow of materials from the refining zone to the melting zone; and wherein said upstream submerged heating means and said downstream submerged heating means are adjacent to said transverse sill;

means for charging said vitrifiable materials into said melting and refining compartment comprising a vitrifiable materials charging port in an upstream end wall of said melting and refining compartment; and a primary melting means for melting said vitrifiable materials in said melting and refining compartment; and melting one or more vitrifiable materials in the furnace to produce a melted glass.

21. A method for forming flat glass which comprises:

constructing a furnace comprising a melting and refining compartment having a length, said melting and refining compartment comprising:

an upstream melting zone capable of containing an upstream convective belt of glass flow;

an upstream submerged heating means positioned within the melting zone to facilitate control of said upstream convective belt of glass flow;

a plurality of submerged bubblers positioned adjacent to and upstream of said upstream submerged heating means;

a downstream refining zone capable of containing a downstream convective belt of glass flow;

a downstream submerged heating means positioned within the refining zone to facilitate control of said downstream convective belt of glass flow; and a transverse sill, positioned transversely to said length between said upstream melting zone and said downstream refining zone, having a bottom surface contacting a bottom surface of said melting and refining compartment, wherein the transverse sill has a vertical cross-section along the length of said melting and refining compartment and includes four sides including a bottom side and a top side and having upper corners which are cut-off, wherein the transverse sill inhibits upstream flow of materials from the refining zone to the melting zone; and wherein said upstream submerged heating means and said downstream submerged heating means are adjacent to said transverse sill;

means for charging said vitrifiable materials into said melting and refining compartment comprising a vitrifiable materials charging port in an upstream end wall of said melting and refining compartment; and a primary melting means for melting said vitrifiable materials in said melting and refining compartment;

melting one or more vitrifiable materials in the furnace to produce a melted glass in the run-out channel;

supplying the melted glass to a plant for forming flat glass; and forming flat glass from said melted glass.

* * * * *